United States Patent [19]

McBride et al.

[11] Patent Number: 4,624,653

[45] Date of Patent: Nov. 25, 1986

[54] CORNER LAMINATING APPARATUS AND METHOD FOR CARTONS

[75] Inventors: Jerald McBride, Spokane; Richard Lile, Veradale, both of Wash.

[73] Assignee: R. A. Pearson Co., Spokane, Wash.

[21] Appl. No.: 774,143

[22] Filed: Sep. 9, 1985

[51] Int. Cl.[4] .............................................. F16H 7/22

[52] U.S. Cl. .................................... 493/127; 493/131; 493/179; 493/443

[58] Field of Search ................. 493/89, 110, 123, 124, 493/126, 127, 128, 130, 131, 140, 141, 151, 179, 183, 434, 442, 443, 453; 15/443, 463

[56] References Cited

U.S. PATENT DOCUMENTS 3,218,940 11/1965 Pearson .............................. 493/130

4,055,110 10/1977 Graham .............................. 493/110

*Primary Examiner*—Francis S. Husar

*Assistant Examiner*—Robert Showalter

*Attorney, Agent, or Firm*—Wells, St. John & Roberts

[57] ABSTRACT

An apparatus and method for erecting a carton having laminated corner structures. A multi-sectioned corner flap is folded progressively between an outer guide in the form of a longitudinal row of rollers and a spiraling row of conical rollers that accurately pinches a bent corner edge of the corner flap structure against the end panel to which it is joined in the carton blank. Surface-to-surface contact between the glued portions of the corner flap and the end panel is prevented until the folding action has been accurately completed.

8 Claims, 21 Drawing Figures

CORNER LAMINATING APPARATUS AND METHOD FOR CARTONS

FIELD OF THE INVENTION

This disclosure relates to machinery and methods for continuously forming laminated corner flap configurations during erection of corrugated cartons or trays.

BACKGROUND OF THE DISCLOSURE

Glued-in corner posts are a structural feature of corrugated cartons or trays designed for vertical stacking. The laminated corner posts are capable of supporting substantial vertical loads beyond those conventionally accommodated by normal cartons or trays. Because the folding of the corner structures requires multiple and progressive steps, this action has previously been accomplished at successive machine stations during intermittent movement of the carton blanks along a conveyor system. This intermittent movement of the carton blanks limits the operational speed of such machinery.

The basic object of the present disclosure is to present a machine and method for progressively folding such corner structures during continuous movememt of blanks from a supply hopper to conventional forming dies at which the carton or tray is erected. Another purpose is to form each corner post by using conical roller surfaces capable of accurately locating and pressing against the significant edges and corner surfaces involved in such laminated corner structures. The continuous operation of the disclosed folding system achieves volume results and speeds impossible in an intermittently operated system.

DETAILED DESCRIPTION OF THE PREFERRED EMBODIMENT

Figure 1:
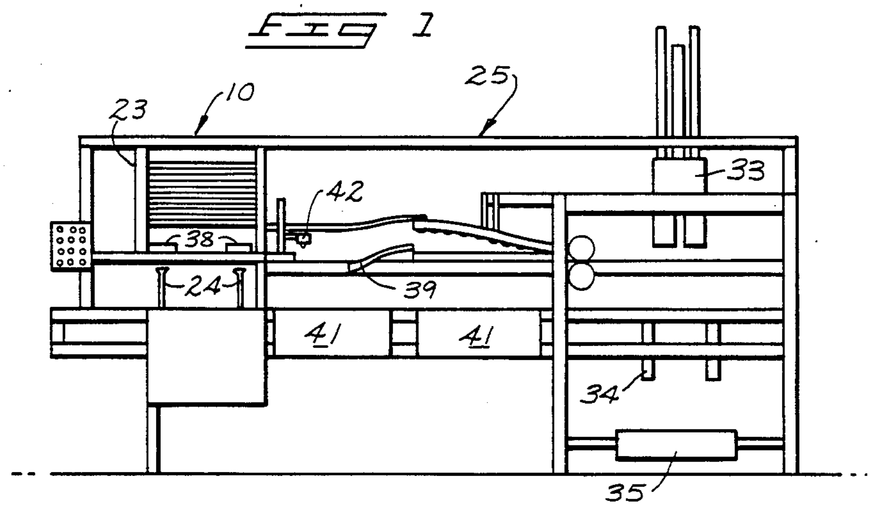
FIG. 1 is a simplified side elevation view of the apparatus.

In compliance with the constitutional purpose of the Patent Laws "to promote the progress of science and useful arts" (Article 1, Section 8), applicant submits the following disclosure of the invention.

This invention relates to an improvement in machines for gluing corrugated cartons or trays having reinforced upright corners produced by laminating corne flap sections aross the corner planes. It constitutes a modification of the basic tray forming machinery disclosed in U.S. Pat. No. 3,218,940, which was issued to R. A. Pearson on Nov. 23, 1965. It is a refinement also of the equipment shown in U.S. Pat. No. 4,055,110, which was issued to Robert H. Graham on Oct. 25, 1977. Both prior patent disclosures are hereby incorporated into this disclosure by reference.

The carton can be best understood by reference to FIGS. 6 through 9 (showing an enclosed rectangular carton having solidly laminated corner walls) and FIGS. 14 through 17 (showing a modified tray or open-sided carton having corners laminated in a triangular configuration). In both instances, the interior corner flaps are laminated to provide additional thickness so as to be capable of withstanding greater vertical loads than can be accommodated by a conventional single thickness corner.

Each blank 10 includes a central rectangular bottom panel 11 flanked at each end by a pair of end panels 12 and at each side by a pair of side panels 21. The end panels 12 are joined to the bottom panel 11 along first scored lines 22 at opposite ends of the bottom panel 11. Corner flaps, generally designated at 14, are joined to each end panel 12 along second scored lines 15 at opposite sides of the end panels.

Each corner flap includes at least three sections, shown in the drawings as first section 16, second section 17, and third section 18. The corner flap sections 16-18 are adapted to be folded relative to one another about parallel third and fourth scored lines 19 and 20, respectively. The side panels 21 are joined to the bottom panel 11 along fifth scored lines 13 at opposite sides of the bottom panel 11. The general manner by which the carton or tray is formed from blank 10 is believed to be evident from the progressions shown in FIGS. 6 through 9 and 14 through 17, respectively.

The general operation and structural details of this type of carton forming machinery is disclosed in the referenced U.S. Pat. No. 3,218,940, and will only be generally set out herein. The machine is supported on a unitary rigid frame 25. Blanks 10 are stored within a supply hopper 23 at one end of frame 25 and ultimately emerge as formed cartons or trays on the upper surface of a receiving conveyor 35 at the opposite end of frame 25.

Individual blanks are discharged from hopper 23 by movable vacuum cups 24 which grasp and draw individual blanks vertically downward from hopper 23. The blanks are transferred to a longitudinal conveyor which continuously transports them along a path parallel to the third and fourth scored lines 19 and 20 joining the corner flap sections 16–18. The conveyor can be in the form of one or more endless chains 36 having pusher lugs 37 that engage the rear edges of end panels 12 on each blank 10 discharged from hopper 23 (see FIG. 2). The combination of vacuum cups 24 and the conveyor chains 36 constitutes delivery means for imparting the required movement to each blank 20 with respect to frame 25.

Figure 6:
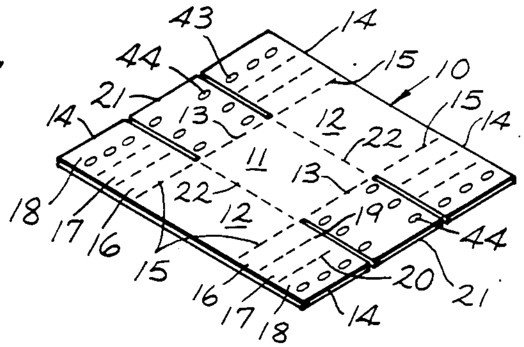
FIGS. 6 through 9 are a succession of views illustrating the folding steps involved in erecting a carton according to this system.
Figure 14:
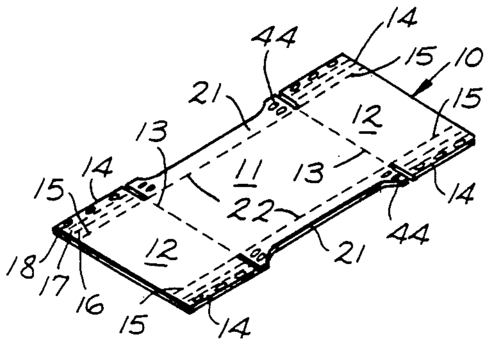
FIGS. 14 through 17 are a succession of views illustrating the folding of an open-sided tray.

A conventional glue application system (generally shown at 41) directs adhesive to nozzles 42 above the path of the blanks 10 moving along conveyor chain 36. A typical glue pattern along the surfaces of the outermost sections 18 on each corner flap is shown at 43 (FIGS. 6, 14). The glue pattern required along side panels 21 for eventual erection of the carton or tray is shown at 44.

Figure 7:
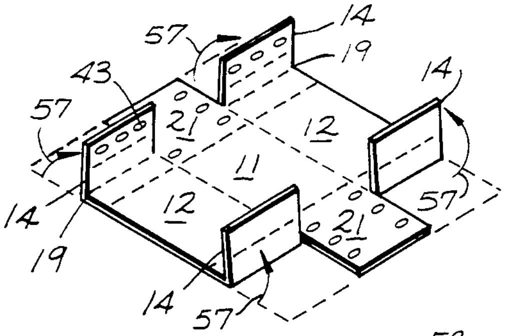
Figure 15:
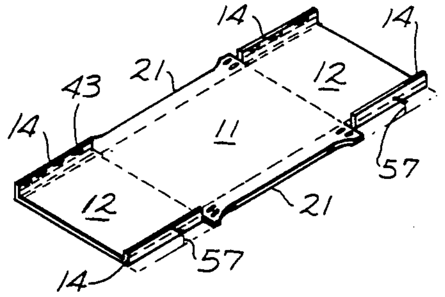
Figure 16:
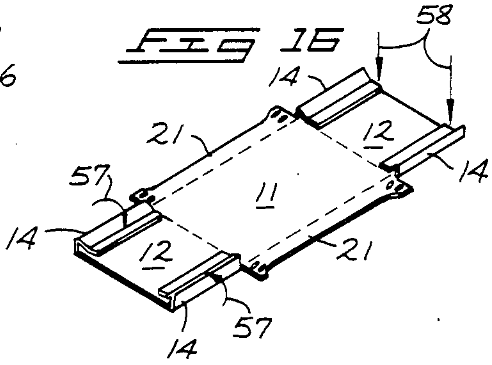
Figure 17:
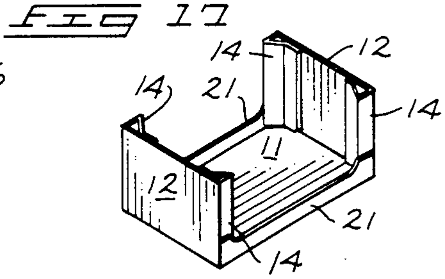
Figure 18:
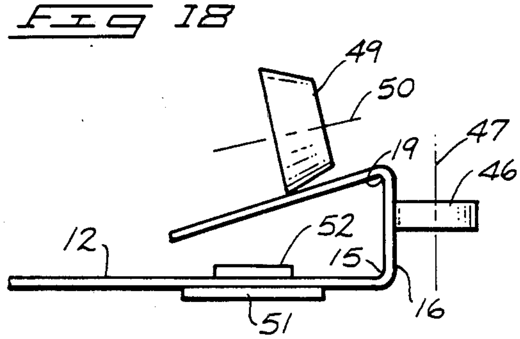
FIGS. 18 through 21 are similar to FIGS. 10 through 13, but illustrate folding of a triangular corner post structure.
Figure 19:
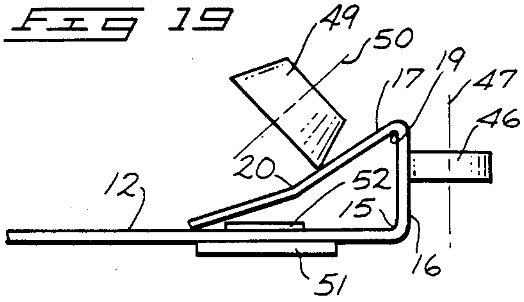
Figure 20:
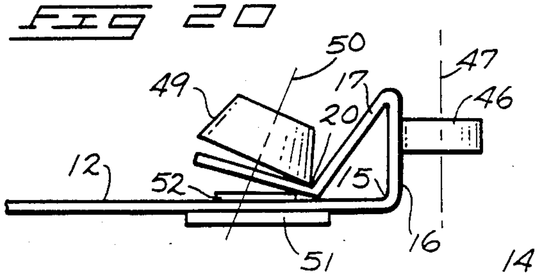
Figure 21:
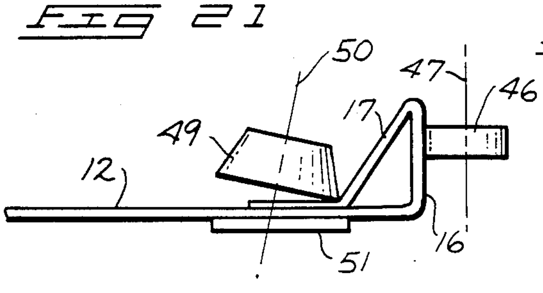

The first folding action accomplished with respect to the carton blanks is illustrated in FIGS. 7 and 15. It requires that each corner flap be folded relative to the end panels 12 about the third score lines indicated at 19. In a prefered embodiment of this invention, this can be accomplished as the planar carton blanks 10 are drawn downwardly from the supply hopper 23. By pulling the flat blanks between protruding stationay curved guides 38 in the path of the corner flap sections 17 and 18, the scored line 19 can be bent, causing the connected sections 17 and 18 to project upwardly relative to the remainder of the blank 10. Additionally, or alternatively, this first folding action might be accomplished by pivoted paddles or bars, similar to the operation of arms 45 disclosed in the referenced patent No. 4,055,110. As another alternative, this first folding action can be accomplished by stationary guides or irons located on frame 25 along the path of movement imparted to each blank 10 by conveyor chain 36.

Figure 2:
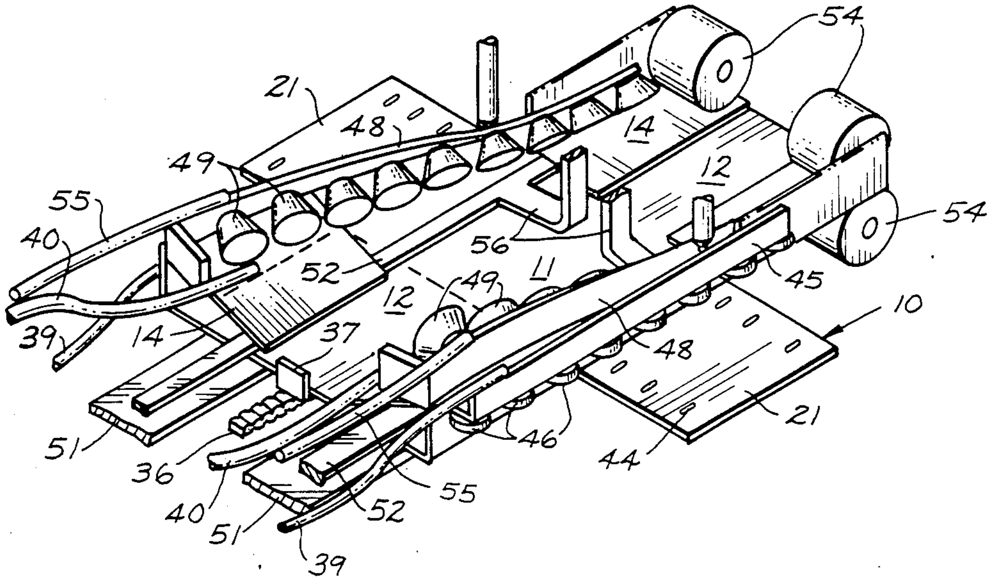
FIG. 2 is a fragmentary perspective view of the corner folding mechanism.

The second folding action imparted to each blank 10 requires that the first section 16 of each corner flap be folded along the second scored line 15 joining it to an end panel 12. This is accomplished along the path of the conveyor chain 36 by a suitably bent folding iron 39 which raises each section 16 to a position perpendicular to the end panel 12 joined to it (Fig. 2). At the same time, the planar second and third sections 17 and 18 of each corner flap are bent beyond the perpendicular by sliding engagement against an upper folding iron 40. The corner flaps are then readied for final folding into the desired laminated configuration prior to forming of the carton or tray between a reciprocating mandrel 33 and receiving forming dies 34.

The novel section of this machine is shown in detail in FIGS. 2 though 5. Its operation is illustrated in FIGS. 10 through 13 and 18 through 22, respectively. It provides a third folding action along the path of the blanks 10 for sequentially folding the corner flap sections 16–18 relative to one another along the third and fourth scored lines 19 and 20 to form a laminated configuration along the side edges of each end panel 12 during transport of a blank along the path of conveyor chain 36.

The folding of the corner flap sections 16–18 for lamination purposes is accomplished by passing the corner flaps between a longitudinal row of rollers 46 and a spiraling row of conical rollers 49. The longitudinal row of rollers 46 serves as an anti-friction extension of the outer end of folding iron 39. The spiraling row of conical rollers 49 serves as an extension of the outer end of folding iron 40. Rollers 46 are supported on a longitudinal roller support 45 at each side of the path of blanks 10 as they are transported along frame 25. They engage the outer surfaces of the first section 16 of each corner flap to maintain it in a position perpendicular to the end panel 12 to which it is joined. The cylindrical rollers 46 ae rotatably journalled about a series of spaced parallel axes 47 oriented perpendicularly to the end panels 12 and other planar portions of the moving blanks 10.

Figure 5:
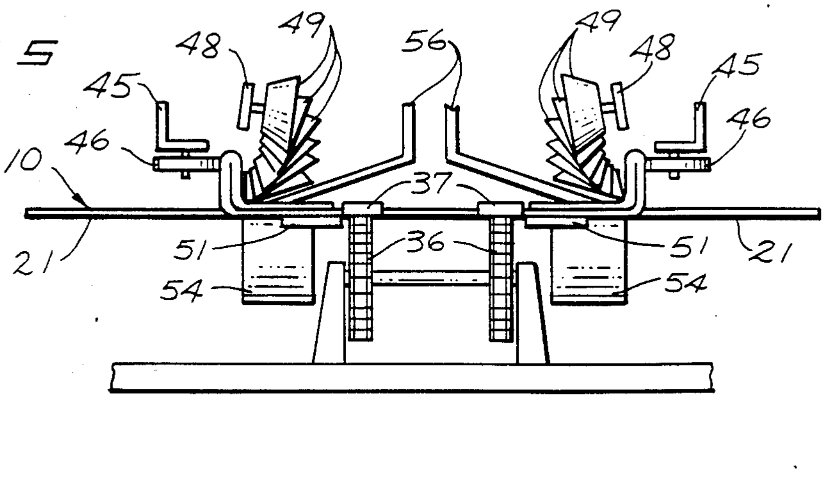
FIG. 5 is an end view corresponding to FIG. 3.

The conical rollers 49 are rotatably journalled on a spiral roller supports 48, which also physically support the outer ends of folding irons 40 by means of extended braces 55. The upstream end of support 48 is nearly vertical and its downstream end is nearly horizontal. As a result, the respective axes 50 of conical rollers 49 vary between orientations that are nearly horizontal to orientations that are nearly vertical or perpendicular to the passing end panels 12 of blanks 10. The sequential progression of rollers can best be seen in FIG. 5.

The moving blanks 10 rest on longitudinal slide plates 51 as they are transported by conveyor chains 36 and lugs 37. The upper surfaces of the first sections 16 of the corner flaps are overlapped by longitudinal retainer bars 52 fastened to the supporting frame 25 by mid-line brackets 56. The retainer bars 52 terminate at outer ends 53, along a transverse line located just prior to the axes of the last conical rollers 49 (see FIG. 3). The final conical rollers 49 are followed by paired upper and lower pinch rollers or opposed belts 54., which are rotatably powered on frame 25.

Figure 3:
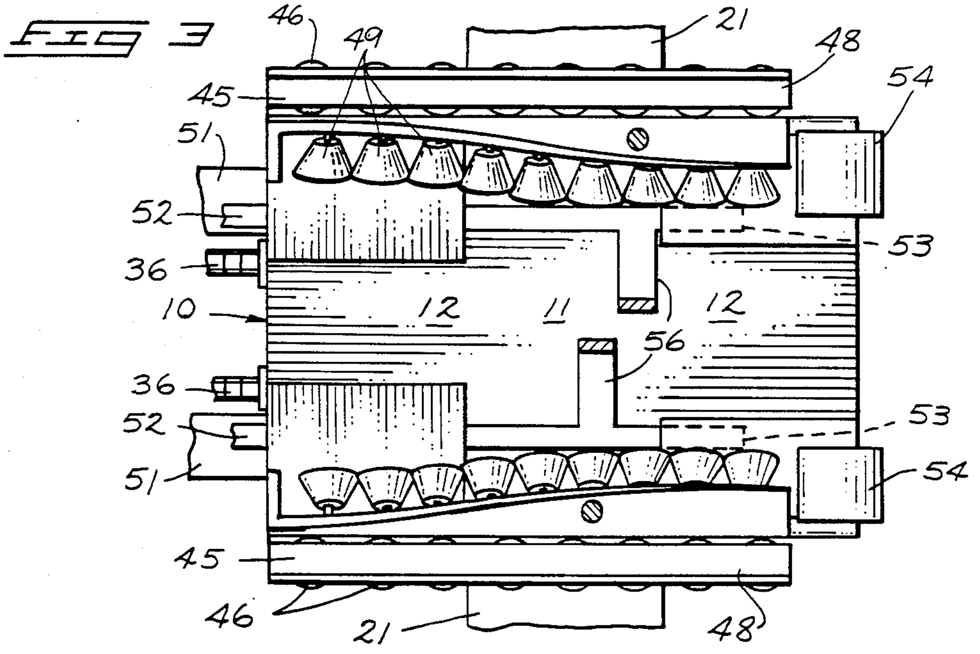
FIG. 3 is a plan view of the corner folding mechanism.
Figure 4:
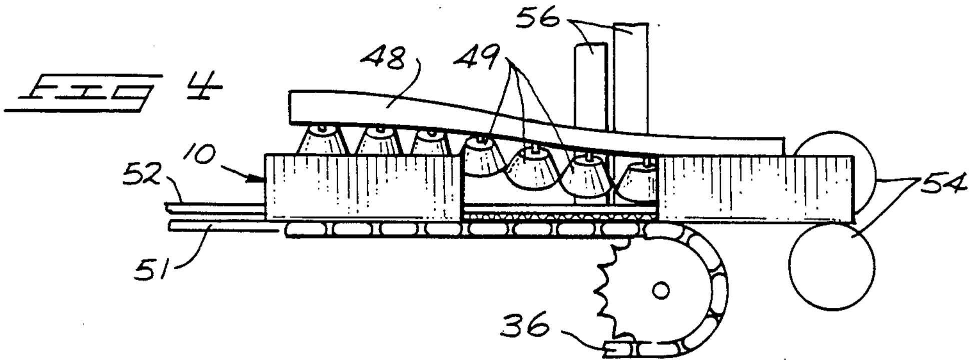
FIG. 4 is an elevation view corresponding to FIG. 3.
Figure 10:
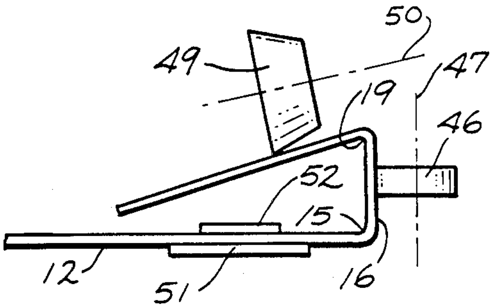
FIGS. 10 through 13 are a series of schematic views illustrating the laminating of a corner structure having perpendicular double wall areas.
Figure 11:
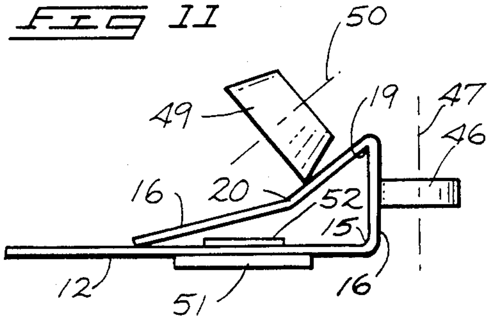
Figure 12:
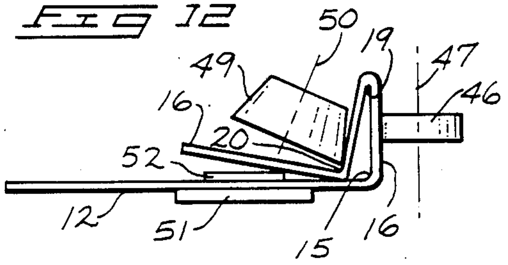
Figure 8:
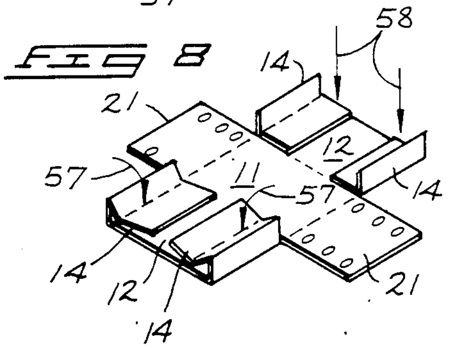
Figure 13:
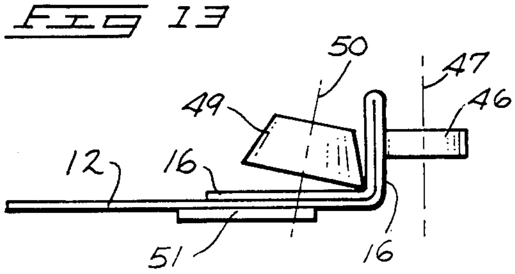
Figure 9:
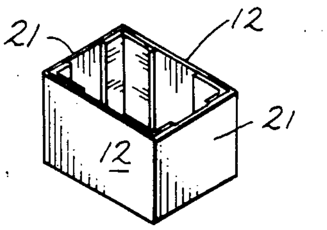

The folding of the corner flap sections can be best understood by reference to FIGS. 10 through 13, which illustrate laminating of a corner to produce double thickness walls at each side of the corner in a perpendicular fashion. As the corner flaps are engaged by the upstream conical roller 49, the flap sections 17 and 18 are deflected downwardly from the scored line 19 that joins the first section 16 to the second section 17 (FIG. 10). As the corner flap proceeds along the row of conical rollers 49, its second section 17 will be progressively folded downwardly, which will cause the outer edge of its third section 18 to engage the upper surface of end panel 12. This will result in bending of the fourth score line 20 between the sections 17 and 18 (FIG. 11). As this bending action progresses (FIG. 12), surface-to-surface contact between the bottom surface of the outermost section 16 of the corner flap and the upper surface of end panel 12 will be prevented by the interposed retainer bar 52 (FIG. 12). Finally, just as the final conical roller 49 brings the fourth scored line 20 into abutment with the second scored line 15 and pushes the corner between the second and third sections 17, 18 of the corner flap into the corner formed between end panel 12 and the first section 16 of the corner flap, the outermost corner flap section will slide beyond the outer end 53 of the interposed retainer bar 52. It will engage end panel 12 due to the inherent tendency of the corner flap structure to return to its initial planar condition (FIG. 13). This will provide the necessary adhesive contact for securing the laminated structure. The overlying portions of the outermost section 16 of the corner flap and the end panel 12 will immediately enter between the rotating pinch rollers or opposed belts 54 while the accurate corner configuration is maintained by the downstream conical rollers 49, as can be seen in FIG. 3.

The progessive folding of the blank 10 throughout the entire apparatus shown in FIG. 1 is sequentially illustrated in FIGS. 6 through 9. Curved arrows 57 in FIG. 8 indicate the forces exerted on the corner flaps by the conical rollers 49. Vertical arrows 58 indicate the forces exerted by the pinch rollers or opposed belts 54.

FIGS. 18 through 21 correspond respectively to FIGS. 10 through 13, and illustrate the modified roller positioning required to bring the fourth scored line 20 into abutment with the end panel 12 at a location spaced from the second scored line 15 in order to form a triangular corner lamination in place of the perpendicular laminations achieved by the arrangement previously discussed. The full sequence of folding operations is similarly illustrated with respect to an open-sided tray in FIGS. 14 through 17. The numerals utilized in illustrating the carton erection system in FIGS. 14 through 21 are identical to those utilized in FIGS. 6 through 13.

The method for laminating the tray or carton involves the steps of directing the individual blanks 10 to the conveyor presented by chains 36 and side plates 51 arranged along a path parallel to the scored lines 19 and 20 between the three sections 16–18 of the corner flaps. It involves continuously transporting the blanks along this path as the corner flap sections are folded relative to one another. Adhesive is applied in a preselected pattern, as shown at 43 and 44. The corner flap sections are progressively folded relative to one another as the blanks 10 are transported along the prescribed conveyor path. Finally, the desired laminated corner structure is secured by adhesive prior to erection of the carton or tray by attachment of the corner flap surfaces to the side panels 21.

In compliance with the statute, the invention has been described in language more or less specific as to structural featues. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. In an apparatus for laminating the upright corners of a tray or carton formed from a blank that includes a bottom panel, end panels joined to the bottom panel along first scored lines at opposite ends of the bottom panel, corner flaps joined to each end panel along second scored lines at opposite sides of the end panels and including at least three sections in each corner flap adapted to be folded relative to one another about parallel third and fourth scored lines, and side panels joined to the bottom panel along fifth scored lines at opposite sides of the bottom panel, the improvement comprising:

a hopper for storing a stack of blanks;

delivery means adjacent to the hopper for discharging individual blanks from said hopper and for continuously transporting them along a path parallel to the third and fourth scored lines joining their corner flap sections;

first means along said path for folding the corner flaps relative to the end panels about said third scored lines;

second means along said path for folding the corner flaps relative to the end panels about said second scored lines;

third means along said path for sequentially folding the corner flap sections relative to one another along the third and fourth scored lines to form a laminated configuration along the side edges of each end panel during transport of a blank along said path;

and means along said path for adhesively securing the outermost section of each corner flap to the end panel joined to it.

2. The apparatus of claim 1 wherein said third means comprises:

first guide means arranged parallel to said path for engaging one section of each corner flap as it moves along said path;

and second guide means arranged in a twisted progression along said path in opposition to said first guide means for engaging one or more remaining sections of the corner flaps to fold them about the third and fourth scored lines in opposition to said first guide means.

3. The apparatus of claim 1 wherein said third means comprises:

first roller means arranged about parallel axes in a plane that is parallel to said path for engaging the outer surface of one section of each corner flap as it moves along said path;

and second roller means arranged individually about axes angularly offset from one another in a spiralling progression along said path in opposition to said first roller means for engaging the outer surfaces of one or more remaining sections of the corner flaps as they are folded into a laminated configuration in response to transport of the blank along said path.

4. The apparatus of claim 3, further comprising:

retaining means along said path and interposed between the outermost section of each corner flap and the end panel joined to it, said retaining means terminating at a location along said path where said second roller means has folded the remaining sections of the corner flaps into the desired laminated configuration during transport of the blank along said path.

5. The apparatus of claim 3 wherein said second roller means comprise a series of conical rollers having an enlarged diameter at one end for rolling engagement along the corner flap sections.

6. A method for laminating the upright corners of a tray or carton formed from a blank that includes a bottom panel, end panels joined to the bottom panel along first scored lines at opposite ends of the bottom panel, corner flaps joined to each end panel along second scored lines at opposite sides of the end panels and including at least three sections in each corner flap adapted to be folded relative to one another about parallel third and fourth scored lines, and side panels joined to the bottom panel along fifth scored lines at opposite sides of the bottom panel, comprising:

directing individual blanks to a conveyor arranged along a path parallel to the score lines joining the corner flap sections;

continuously transporting the blanks along said path;

applying adhesive to the blank in a preselected pattern;

and folding the corner flap sections relative to one another along the parallel scored lines adjoining them as the blanks are transported along said path in the following progression of steps;

folding the corner flaps relative to the end panels about said third scored lines;

folding the corner flaps relative to the end panels about said second scored lines;

folding the corner flap sections relative to one another along the third and fourth scored lines to form a laminated configuration along the side edges of each end panel;

and adhesively securing the outermost section of each corner flap to the end panel joined to it.

7. The method of claim 6 wherein the step of folding the corner flap sections relative to one another along the third and fourth scored lines to form a laminated configuration brings the fourth scored lines into abutment with the second scored lines.

8. The method of claim 6 wherein the step of folding the corner flap sections relative to one another along the third and fourth scored lines to form a laminated configuration brings the fourth scored lines into abutment with the end panels at locations spaced from the second scored lines.

* * * * *